Nov. 2, 1943.  E. M. BARRETT  2,333,228
TOOL HOLDER
Filed Feb. 19, 1942  2 Sheets-Sheet 1
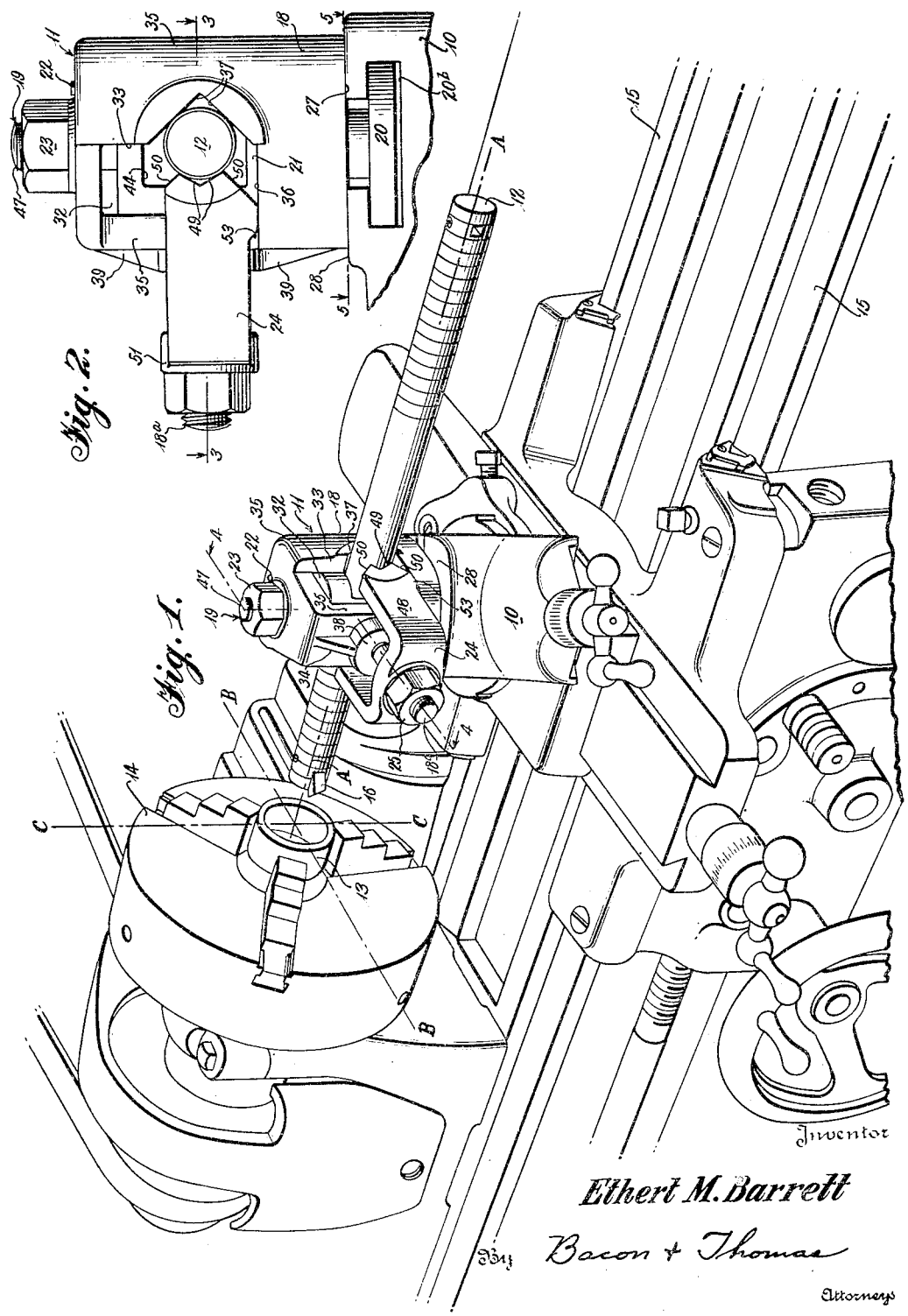
Inventor
Ethert M. Barrett
Bacon & Thomas
Attorneys

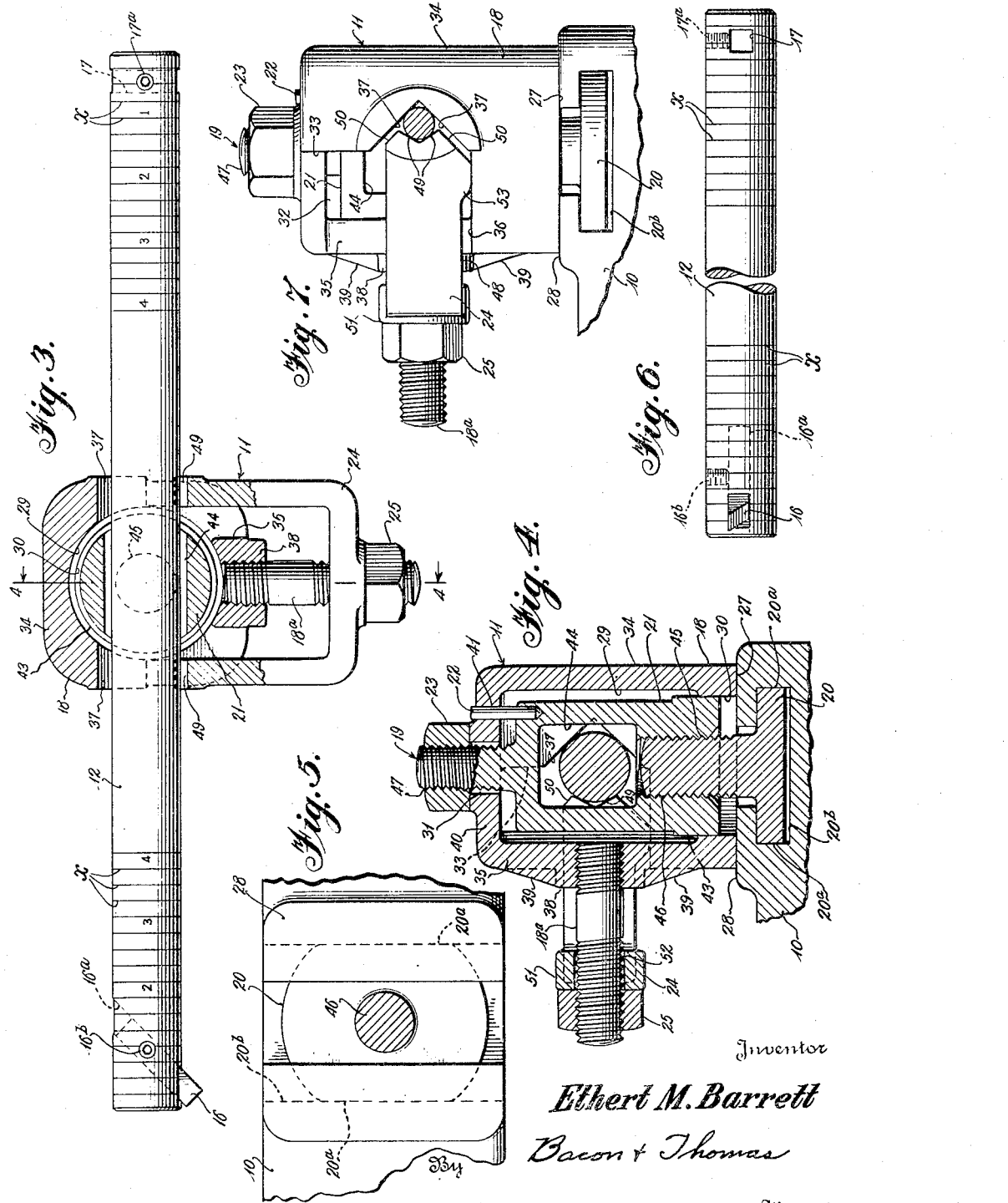

Patented Nov. 2, 1943

2,333,228

UNITED STATES PATENT OFFICE 2,333,228

TOOLHOLDER

Ethert M. Barrett, El Monte, Calif., assignor to Clayton Manufacturing Company, Alhambra, Calif.

Application February 19, 1942, Serial No. 431,583

21 Claims. (Cl. 77—56)

The present invention relates to a tool holder adapted to be used in metal-turning lathes and other machine tools.

More specifically, the invention relates to a boring bar holder adapted to be secured to a lathe slide or other suitable support.

The principal object of the invention is to provide a tool holder which is extremely rigid in construction and which prevents chattering of the tool and provides for extreme accuracy in the dimensions of the work.

Another object of the invention is to provide a rigid tool holder consisting of few parts and which has a minimum of clamping members for securing the holder to a support and for securing a tool in the holder.

Another object of the invention is to provide a tool holder in which the clamping post for the tool holder and the tool itself are so arranged that no substantial stresses are set up in the post due to any overhanging of the tool in front of or to the rear of said post.

Another object of the invention is to provide a boring bar holder of increased capacity adapted to receive tools of a wide range of sizes and which is so arranged and constructed that the axis of the boring bar always lies in a horizontal plane common to the axis of the lathe spindle regardless of the size of the tool being used.

A further object of the invention is to provide a tool holder in which separate clamping means are provided for the tool and the tool holder so that one can be adjusted independently of the other and without disturbing the adjustment of the other.

A still further object of the invention is to provide cooperating V-shaped clamping surfaces for the tool arranged upon such relative angles as to greatly increase the capacity of the tool holder for receiving tools of different cross-sectional sizes without sacrificing any of the clamping effectiveness of the tool holder.

One of the important features of the invention resides in forming at least the base portion of the body of the tool holder so that it is generally square in outside contour, to thereby enable the same to more rigidly support the tool or boring bar.

A further important feature of the invention resides in providing a clamping post having a center member through which the boring bar or other tool passes and which center member is prevented from turning with respect to the main body of the tool holder so that the opening in said center member is always properly aligned for the passage of the boring bar or other tool therethrough.

Other objects and features of the invention will be apparent from the following description taken in conjunction with the accompanying drawings, in which:

Fig. 1 is a perspective view of the tool holder and a boring bar mounted in a lathe;

Fig. 2 is an end elevational view of the tool holder shown in Fig. 1;

Fig. 3 is a horizontal sectional view through the tool holder taken on the line 3—3 of Fig. 2;

Fig. 4 is a vertical sectional view through the tool holder taken on the lines 4—4 of Figs. 1 and 3;

Fig. 5 is a horizontal sectional view taken on the line 5—5 of Fig. 2;

Fig. 6 is a side view of the boring bar; and

Fig. 7 is a view similar to Fig. 4, but showing a much smaller boring bar clamped in the tool holder.

Referring now to Fig. 1 of the drawings, a compound lathe slide is generally indicated by the numeral 10 and carries the tool holder generally indicated at 11. A boring bar 12 is shown mounted in the holder in position to be manipulated to turn the interior of a bushing 13. The bushing 13 is mounted in a conventional chuck 14 carried by the lathe spindle in a well known manner. It is to be especially noted at this point that the axis A—A of the boring bar 12 lies in the same horizontal plane as the axis about which the chuck 14 rotates, as indicated by the lines B—B and C—C. It will be understood, of course, that the slide 10 is movable transversely of the lathe bed 15 in order to engage a cutter 16 carried at one end of the boring bar 12 with work pieces of different diameters or to position the cutter 16 to make cuts of various depths, as in conventional practice. The cutter 16 is received in a slot 16$^a$ extending at an angle of about 45 degrees to the axis of the boring bar 12 and is secured in place by a socket type set screw 16$^b$. A slot 17 extends through the opposite end of the boring bar at right angles to the axis to provide for different angular disposition of the cutter 16 relative to the work. A set screw 17$^a$ is provided to hold a cutter in the slot 17. A series of graduations X are formed on the boring bar to facilitate adjustment of said bar with respect to the tool holder for various depths of cuts. Each graduation may represent a suitable fraction of an inch, for example, ¼".

The tool holder comprising the present invention consists of comparatively few parts; namely, the main body 18 carrying a stud 18ᵃ; a center post 19 comprising a T-headed member 20, a center member 21, a dowel pin 22 mounted in the upper end of said center member, a threaded extension 47, and a clamping nut 23 on said extension; a generally U-shaped bar clamping element 24 and a nut 25 on the stud 18 for holding the clamping element 24 in adjusted position.

The tool holder body 18 has its lower face 27 preferably machine finished so that it will rest flush upon the machined pad 28 of the lathe slide 10. The tool holder 18 is generally square in contour, as is best shown in Fig. 3, and contains a cavity generally indicated at 29, the lower end of the cavity having a bore 30 which is of reduced diameter (see Fig. 4). The body 18 may also be described as a generally inverted cup, the bottom wall 40 of which has an aperture 31 aligned with the bore 30.

The tool holder body 18 is further provided with openings 32 formed in opposite sides thereof and defined in part by medial upright or vertical edge walls 33. Between the edge walls 33 is a rigid back wall 34 and between the openings 32 is a front wall 35. The walls 33 lie in a vertical plane passing through the axis of the bore 30 and each is provided with a V-shaped notch or way, the walls 37 of which extend at an angle of about 45 degrees to the horizontal. The front wall 35 carries a boss 38 and is stiffened by webs 39. The wall 40 of the body 18 is provided with an opening 41 to slidably receive the dowel pin 22 carried by the center member 21.

It will be apparent from the drawings and the foregoing description that the body 18 is made rigid by virtue of the thick back wall 34 and the reinforced front wall 35, so that no possible distortion or twisting thereof can occur in use.

The assembly of the center post 19 and its operative relation to the tool holder body 18 is probably best illustrated in Fig. 4. The center member 21 is preferably generally cylindrical and has a lower machine-finished portion 43 adapted to be received within the finished bore 30 of the body 18. An elongated opening 44 is formed in the center member 21 so that the boring bar 12 can extend therethrough. The dowel pin 22 previously referred to normally prevents the center member 21 from turning relatively to the body 18 and thus properly maintains the opening 44 in alignment at all times with the openings 32 in said body so that the boring bar 12 or a boring bar of different size can be inserted therethrough without hindrance. The lower end of the center member 21 is provided with a threaded bore 45 which receives the threaded stem 46 of the T-headed member 20. As will be apparent from Fig. 5, the head 20 is flattened at 20ᵃ—20ᵃ and is not-rotatably received in a T-shaped slot 20ᵇ formed in the slide 10. The upper end of the center member 21 carries the threaded extension 47 which projects through the opening 31 in the body 18 and is adapted to receive the clamping nut 23.

The U-shaped clamp 24 has opposed substantially parallel legs 48 which terminate in smooth clamping surfaces 49 extending at an angle of about 60 degrees relative to the horizontal so as to form V-shaped ways confronting the V-shaped ways provided by surfaces 37 on the body 18. Surfaces 50 diverge from the surfaces 49 on an angle of about 45 degrees so that they lie parallel with the surfaces 37. By having the confronting V-shaped clamping surfaces 37 and 49 disposed upon different angles, it is possible to increase the capacity of the tool holder by enabling the same to hold a boring bar of smaller diameter than would be possible if the surfaces extended on the same angle. It will be further noted that by making the surfaces 50 parallel with the surfaces 37, the surfaces 49 can be brought closer to said surfaces 37 so that a tool holder is provided which is capable of holding a boring bar of a very small size, as will be clear from Fig. 7.

The apex of the V-shaped ways 37 is positioned at a predetermined height above the lathe slide 10 and preferably so that it lies in a horizontal plane common to that of the lathe spindle, so that regardless of the size of boring bar used, said bar will always have its axis in a plane common to the lathe spindle. The stud 18ᵃ has its center in the same plane as the apex of the ways 37 so that the legs 48 of the clamping element 24 normally assume a position with the apex of the ways 49 in a plane common to the ways 37, as will be more clear from the description below.

The U-shaped clamping element 24 is provided with a boss 51 (Fig. 4) and has an aperture 52 so that it can be readily mounted upon the stud 18ᵃ. The nut 25 carried by said stud is adapted to engage the boss 51 to exert force on the clamp 24 to hold the boring bar 12 in rigid relation with the body 18. Each of the legs 48 of the clamping element 24 carries a lug 53 near its end which is adapted to slide upon the surface 36 during tightening of the clamp without substantial tilting. The legs 48 of the U are spaced a substantial distance apart and the lugs 53 preferably engage the surfaces 36 when the bar 12 is clamped tightly so that there is no tendency for said bar to rock relative to the horizontally aligned V-shaped ways 37 and 49.

As has been previously stated, the boring bar engaging surfaces of the body 18 are so arranged that the boring bar is held with its axis lying in the same horizontal plane as the lathe spindle. Hence, when the boring bar 12 is passed through the openings 32 in the body 18 and the elongated opening 44 in the center member 21 and engaged with the V-shaped ways 37, said bar is automatically positioned at the proper height for turning. The boring bar can then be positioned lengthwise relatively to the tool holder body 18 so that a sufficient length thereof will extend toward the work in order to make a cut of the desired depth (the graduations X facilitating such positioning), and the bar may also be rotated to the desired angle to position the point of the cutting tool 16 for proper engagement with the work and then clamped in the final desired positions of adjustment simply by tightening the nut 25.

On the other hand, the tool holder body 18 can be clamped upon the lathe slide 10 simply by tightening of the nut 23. As has been previously indicated, the center member 21 is locked against rotation by the dowel pin 22 so that it is prevented from turning when the nut 23 is tightened.

It will be apparent that the present tool holder also permits the boring bar to be adjusted at an angle to the lathe bed ways 15. In such event, the tool holder body 18 is turned relative to the post 19 to the desired angle and the single nut 23 is then tightened to lock the tool holder in position. Of course, the center member 21 turns with the body 18 by virtue of the pin connection 22 and the openings in these parts remain aligned.

The vertical position of the elongated opening 44 in the center member 21 can be varied relative to the body 18 if necessary by adjusting the head 20 to raise or lower said center member with respect to the lathe slide 10. This adjustment can be made in several ways, for example, by dismounting the tool holder assembly from the lathe slide 10 and then turning the T-headed member 20 to effect the necessary adjustment; or the post 19 can be allowed to remain on the slide 10, the nut 25 and the body 18 being removed and the center member 21 then turned to raise or lower the opening 44 with respect to the top surface of the slide. The body 18 can then be slipped back over the post 19 with the dowel pin 20 entering the opening 41 and then locked in the desired position by replacing and tightening the nut 23.

It will be clearly apparent from Fig. 1 that the boring bar 12 is disposed in intersecting relation with the post 19 so that the possibilities of vibration and chatter common in prior known tool holders are completely eliminated. It is also apparent that the comparatively square base of the body 18 provides for maximum stability of the tool holder as a whole.

It will be understood that various changes in the construction and details of the tool holder illustrated and described herein may be made without departing from the spirit of the invention or the scope of the appended claims.

I claim:

1. A boring bar holder comprising: a body having clamping surfaces; a clamping post extending through said body for securing said body to a support; and a clamping element carried by said body having clamping surfaces cooperable with the clamping surfaces on said body for rigidly securing a boring bar to said body, said clamping post having an opening in the same horizontal plane as said clamping surfaces and arranged so that the boring bar can extend therethrough.

2. A boring bar holder comprising: a body; a clamping post for securely clamping said body to a support, said clamping post being arranged in substantially concentric telescopic relation with said body, said clamping post having an aperture for the passage of a boring bar therethrough; and means independent of said body clamping means for clamping said boring bar to said body.

3. A tool holder comprising: a hollow body having clamping surfaces arranged at an angle relative to each other; a clamping post operatively associated with said body for securing the same to a support and including an apertured center member within said body; and means for clamping a tool against the angular clamping surfaces of said body with the tool extending through the opening in said center member.

4. A tool holder comprising: a body; a clamping post for clamping said body to a support including a portion within said body, said clamping post portion and body, respectively, having aperture means for the passage of a tool therethrough; and means independent of said body clamping means for clamping said tool to said body.

5. A boring bar holder comprising a body; a clamping post for clamping said body to a lathe slide rest including a portion within said body, said clamping post portion and body each having aperture means for the passage of a boring bar therethrough; means for maintaining said aperture means in said clamping post portion and body in alignment; and means carried by said body for clamping said boring bar to said body.

6. A boring bar holder comprising a body; a clamping post for clamping said body to a lathe slide rest including a center member within said body, said center member and body having aligned openings for the passage of a boring bar therethrough; means holding said body and center member against turning relative to each other; and means for clamping said boring bar to said body.

7. A tool holder comprising: a body; a clamping post for clamping said body to a support including a center member within said body, said center member and body each having an opening for the passage of a tool therethrough; a pin carried by said center member and slidably received in an aperture in said body and preventing said center member from turning relative to said body and thus maintaining said openings in alignment; and means for clamping said tool to said body.

8. A boring bar holder comprising: a body having a front wall and a back wall, said back wall having upright edges including surfaces arranged at an angle to each other and adapted to be engaged by a boring bar; a stud projecting only outwardly from said front wall; means carried by said stud for clamping a boring bar against said angularly arranged surfaces; and means for clamping said body upon a lathe slide.

9. A tool holder comprising: a hollow body element having opposed sides and V-shaped ways formed in the edges of a pair of said opposed sides; and a clamping element having V-shaped ways adapted to cooperate with said first-mentioned V-shaped ways to hold a tool in place, the walls of the V-shaped ways of one of said elements diverging at an angle greater than that of the walls of the V-shaped ways of the other of said elements, whereby tools of a wide range of sizes can be clamped in said tool holder.

10. A tool holder comprising: a body element having a V-shaped way formed therein; and a clamping element having a V-shaped way adapted to cooperate with said first-mentioned V-shaped way to hold a tool in place, the walls of the V-shaped way of one of said elements diverging at an angle greater than that of the walls of the V-shaped way of the other of said elements, whereby tools of large and relatively small sizes can be clamped in said tool holder.

11. A tool holder comprising: a body element having a V-shaped way formed therein; and a clamping element having a V-shaped way adapted to cooperate with said first-mentioned V-shaped way to hold a tool in place, the walls of the V-shaped way of one of said elements diverging at an angle greater than that of the walls of the V-shaped way of the other of said elements, and one of said elements having walls adjacent those constituting the V-shaped way thereof but being arranged parallel to the walls constituting the V-shaped way of the other of said elements, whereby a wide range of sizes of tools can be clamped in said tool holder.

12. A tool holder comprising: a body element having a V-shaped way formed by surfaces extending on an angle at about 45 degrees to the horizontal; and a clamping element having a V-shaped way formed by surfaces extending on an angle of about 60 degrees to the horizontal and adapted to cooperate with said first-mentioned V-shaped way to hold a tool in place, said clamping element also having walls adjacent the V-shaped way thereof extending on an angle of about 45 degrees to the horizontal and arranged substantially parallel to the walls defining the V-shaped way of said body, whereby a wide range of sizes of tools can be clamped in said tool holder.

13. A boring bar holder comprising: a generally square hollow body provided with opposed openings in the side walls thereof, the openings in said side walls being defined in part by angularly arranged surfaces adapted to be engaged by a boring bar, a clamping post including a center member received in said body, said center member having a threaded opening at its lower end for the reception of the threaded stem of a member adapted to cooperate with a T-slot in a lathe slide and whereby said center member can be adjusted vertically with respect to said body, and means at the upper end of said center member for clamping said body to said lathe slide, said center member having an opening aligned with the openings in said body and through which said boring bar can extend; means for normally preventing said center member from turning with respect to said body; and means carried by said body for clamping the boring bar in place.

14. A boring bar holder comprising: a generally inverted cup-shaped body provided with openings in the side walls and bottom thereof, the openings in said side walls being defined in part by angularly arranged surfaces adapted to be engaged by a boring bar; a post for clamping said body to a lathe slide including a center member received in said inverted cup-shaped body, said center member having a threaded opening at its lower end for the reception of the threaded stem of a member adapted to cooperate with a T-slot in said lathe slide, a threaded extension at the upper end of said center member projecting through the opening in the bottom of said generally cup-shaped body, a clamping nut upon said extension, and a pin carried by said center member projecting into an opening in said body to prevent relative rotation of said center member with respect to said body; a stud extending outwardly from a side wall of said body; a U-shaped clamping element carried by said stud and adapted to have the ends of the legs thereof engage said boring bar, said center member of said post having an opening through which said boring bar normally extends; and a nut on said stud cooperable with said clamping element to hold the boring bar in place.

15. A boring bar holder comprising: a body element having a V-shaped way formed therein; a U-shaped clamping element straddling a portion of said body element and having a V-shaped way formed in each end of the legs thereof; means for maintaining the apex of the V-shaped ways of said clamping element aligned at all times with the apex of the V-shaped ways of said body element; and means for maintaining the V-shaped ways of said clamping element in engagement with a boring bar.

16. A boring bar holder comprising: a body having V-shaped groove means for receiving a boring bar; clamping means for securing said body to a support; and additional clamping means for clamping said boring bar in said V-shaped groove means with said boring bar in intersecting relation to said first-mentioned clamping means.

17. A boring bar holder comprising: a body having V-shaped groove means for receiving a boring bar; a post arranged to clamp said body to a support; and clamping means independent of said post for securing a boring bar in said V-shaped groove means in intersecting relation to said post.

18. A tool holder comprising: a body; a clamping post extending through said body, said clamping post including a member having a threaded opening at the lower end thereof; a bolt-like member having a head and a threaded stem, said head being adapted to be received in a T-slot of a tool holder support and said stem being received in said threaded opening, whereby the spacing of said first-mentioned member relative to said tool holder support can be varied simply by rotating one of said members relative to the other; and means on the upper end of said first mentioned member cooperable with said body for clamping said body to said tool holder support.

19. In a tool holder, a clamping post comprising: a member having a threaded opening at the lower end thereof; a bolt-like member having a head and a threaded stem, said head being adapted to be received in a T-slot of a tool holder support and said stem being received in said threaded opening, whereby the spacing of said first-mentioned member relative to a tool holder support can be varied simply by rotating one of said members relative to the other.

20. In a tool holder, a clamping post comprising: a member having a transverse opening intermediate its upper and lower ends for the passage of a tool therethrough and having a threaded opening at the lower end thereof; a bolt-like member having a head and a threaded stem, said head being adapted to be received in a T-slot of a tool holder support and said stem being received in said threaded opening, whereby the spacing of the opening of said first-mentioned member relative to a tool holder support can be varied simply by rotating one of said members relative to the other.

21. A boring bar holder comprising: a body; a post for clamping said body to a support in a desired adjusted position, said body having V-shaped ways on the opposite sides of said post for supporting a boring bar; and means independent of said body clamping means for clamping said boring bar to said body with said boring bar in intersecting relation to said clamping post, whereby said boring bar may be adjusted without disturbing the adjustment of said body.

ETHERT M. BARRETT.